(12) United States Patent
DellaMorte, Sr. et al.

(10) Patent No.: US 7,450,528 B1
(45) Date of Patent: Nov. 11, 2008

(54) METHOD AND APPARATUS FOR PERFORMING ECHO SUPPRESSION

(75) Inventors: James Thomas DellaMorte, Sr., West Barnstable, MA (US); John O. DellaMorte, Jr., Sandwich, MA (US)

(73) Assignee: Dialogic Corporation, Montreal, Quebec (CA)

( * ) Notice: Subject to any disclaimer, the term of this patent is extended or adjusted under 35 U.S.C. 154(b) by 621 days.

(21) Appl. No.: 10/780,501

(22) Filed: Feb. 17, 2004

(51) Int. Cl.
*H04B 3/20* (2006.01)
(52) U.S. Cl. ................................... 370/286
(58) Field of Classification Search ........... 370/286
See application file for complete search history.

(56) References Cited

U.S. PATENT DOCUMENTS

| | | | | |
|---|---|---|---|---|
| 3,673,355 A | * | 6/1972 | La Marche et al. ........ | 370/287 |
| 6,167,133 A | * | 12/2000 | Caceres et al. ......... | 379/406.13 |
| 6,269,161 B1 | * | 7/2001 | McLaughlin et al. ... | 379/406.01 |
| 6,662,211 B1 | | 12/2003 | Weller | |
| 2002/0101830 A1 | * | 8/2002 | LeBlanc ................. | 370/286 |
| 2002/0165718 A1 | * | 11/2002 | Graumann et al. ...... | 704/270 |

* cited by examiner

*Primary Examiner*—Ramnandan Singh
(74) *Attorney, Agent, or Firm*—Weingarten, Schurgin, Gagnebin & Lebovici LLP

(57) ABSTRACT

An echo suppression technique is provided in which speech sample energies are collected and accumulated over predetermined time frames. From this, a peak aggregate value and time delay are noted. This peak is generated by mathematical correlation between the historical output speech and the input speech. A moving average is applied to the results of the mathematical correlation. Once the time delay and gain are determined, the algorithm of the present invention uses this information to determine if an input sample is echo or a valid input, and if it is echo, the echo is suppressed.

8 Claims, 6 Drawing Sheets

METHOD AND APPARATUS FOR PERFORMING ECHO SUPPRESSION

CROSS-REFERENCE TO RELATED APPLICATION

This application is related to U.S. patent application Ser. No. 10/780,503 of DellaMorte et al. for a METHOD AND APPARATUS FOR PERFORMING CONFERENCING SERVICES AND ECHO SUPPRESSION filed on even date herewith, and which is incorporated herein by reference.

BACKGROUND OF THE INVENTION

1. Field of the Invention

The present invention relates generally to the field of telecommunications and, more specifically, to a method and apparatus for performing conferencing services and echo suppression.

2. Background Information

Audio conferencing techniques intelligently mix the input speech of multiple parties to produce an accurate output that is then played back to the parties. By way of background, it has been known that for a conference having a small number of participants, the input speech signals (from each participant) are summed to produce an output that is then transmitted as a conference output signal to each of the participants.

For larger conferences, the simple sum approach is not effective due to the noise involved. Specifically, when there are many conference participants, each with standard office noise in the background, the sum of this background noise itself can overwhelm the conference. Thus, it has been known to limit the number of participants whose input speech is summed to form the conference output signal. Typically, a small subset of the total participants, often three, is summed to produce the output. In one solution, the input speech of the actively speaking parties having the highest amplitude (loudest) are selected and summed as the conference output signal. In other cases, the input speech of the greatest energies are selected for inclusion in the conference output signal.

These approaches partially alleviate the noise issue, however, noise continues to be a problem even with the selection of larger amplitude conference participants. This is because one participant may, for example, be the participant with the highest amplitude only because he is driving in a car on a noisy highway and is thus, due to the noise level and amplitude thereof, qualifying as one of the top contenders. This deteriorates the quality of the conference for all participants.

Furthermore, simply selecting the largest amplitude participants of the conference can be difficult when there are participants with greatly different volumes. This can occur due to poor line conditions, faulty telephones or quirks of personality in the sense that some people are softer speakers than others. If a participant with a lower amplitude voice input is attempting to establish himself within the top three contenders, this may not happen in a timely manner and the beginning of his words can be clipped. And, even when added to the conference, it may be difficult for the other participants to hear the soft-spoken participant.

A further issue arises with respect to DTMF (dual tone multi-frequency) signals. As will be understood by those skilled in the art, the familiar DTMF signals that are generated when keys are pressed on the traditional touch tone phone set, are actually comprised of two tones. The two tones consist of two distinct frequencies, a row frequency and a column frequency. It has been known to provide a DTMF detector, which operates such that by determining the row frequency and the column frequency, the DTMF detector identifies the touch-tone that was pressed.

In some conferencing applications, a participant can control his or her individual volume (or other parameter) using the touch-tone signals. For example, the control might be that a participant may press "1" to increase volume, and "2" to decrease volume. However, if a participant uses this feature and presses the keys, the DTMF tone thus produced enters the conference. That tone could then be sent back out to other participants as part of the conference output signal. If there is an echo, the tone will be reflected back and the reflection could then cause the results of the DTMF signals (such as an increase in volume) thus the volume is continuously increased because an echoed DTMF tone is repeatedly amplified and sent back out to the conference, clearly disrupting the conference. In addition, the DTMF tones themselves can be quite loud and can be an annoyance to the participants.

Another problem that occurs in large conferences is that of line echo. In the conferencing setting, an echoed signal can be summed back into the conference output signal and sent back out onto the line. More specifically, an echo is generated whenever a telephone signal is converted from a four-wire connection to a two-wire connection (a standard PSTN connection). This echo is a delayed and attenuated version of the original signal. An echo can make conversation impossible and in a conference, echo can be tremendously disruptive. Most telecommunications networks incorporate echo cancellers to remove echo. However, as networks become more complex and elements such as cell phones and speakerphones are introduced, echo cancellation, in turn, becomes more complex.

A network echo cancellation component creates a model of the telephone line echo. Using the model, the circuit creates a synthetic echo, which is subtracted from the input speech thus canceling the echo signal. This process is continually monitored and adapted. The end result is a relatively echo-free signal being generated. In most robust echo cancellation systems, the echo canceller is followed by an echo suppression or non-linear process to remove or mask any remnants of the echoed speech that may have been missed. This works well, but the disadvantage of this type of echo cancellation technique is that it is computationally quite expensive to develop the synthetic echo that is then subtracted from the signal.

Echo suppression, on the other hand, is a somewhat simpler solution that generally can be a useful technique in areas other than conferencing, for example. Echo suppression determines when a signal qualifies as echo (as opposed to voice) and based upon this determination mutes this input signal when it is expected to be an echo signal. Typically a voice activity detector is used on both the inbound and outbound legs to determine when echo is present. And, if it is present, the signal will be muted. Known echo suppression techniques have not been effective in the large conference environment.

There remains, therefore, a need for a conferencing algorithm that results in input signal selection that includes participants who are actively speaking and not those that are simply loudest due to background noise. There remains a further need for a method and apparatus for performing conferencing for a large number of participants, which has improved noise reduction, and is capable of producing an echo free output signal but yet is computationally cost effective. There remains yet a further need for a method and apparatus for performing conferencing that removes DTMF tone from the input signals.

SUMMARY OF THE INVENTION

In brief summary, the present invention provides a method and apparatus for providing conferencing services in a converged services platform operable to perform a variety of enhanced telecommunications services. The advanced conferencing algorithm embodying the invention, which can be used for the audio portion of a video conference, or for a solely audio conference, involves an attendee process in which input speech of a conference participant, known herein as an "attendee," is evaluated to determine whether it should be summed back into the conference. A number of functions are performed, including calculating the energy of the speech sample, to identify and remove noise, and to suppress echo, and to remove DTMF tones.

More specifically, the present invention employs a noise gating function that takes advantage of the process which already occurs in the conferencing algorithm whereby the energy of the input speech of each attendee is measured on a per sample basis. For the noise gating feature, a histogram of all of the energy levels as measured is created. The histogram plot reveals peaks in the signal. These peaks are scanned and evaluated to determine noise. It is noted that a primary spike in the histogram is most likely due to the noise gating process of a hardware component being used by one of the participants. Thus, a secondary spike or even later spikes are evaluated in accordance with the present invention to determine the noise gating level.

Now that the noise gating process portion of the algorithm of the present invention has muted out noise, then in accordance with a further aspect of the invention, the attendee's input signal is sent to a voice activity detector to ascertain whether it is valid speech. If it is speech, then the signal is subjected to an echo suppression process in accordance with the present invention, which is an improved technique for determining a time delay and a gain that is associated with echo. Accumulated energies are collected at predetermined intervals and plotted. From this a peak and time delay are noted. This peak is generated by mathematical correlation between the historical output speech and the input speech. A moving average is applied to smooth the plots in accordance with a further feature of the invention. Once this time delay and gain are determined, the algorithm of the present invention uses this information to determine if an input sample is echo or a valid input. If the output energy times the gain is greater than or equal to the input energy, then the signal is deemed to be an echo signal and it is suppressed from the input signal. Otherwise, it is valid speech.

Next, the speech sample is subjected to an automatic gain control process that adjusts gain to a nominal level, determined based upon the particular application in which the conferencing algorithm is being employed.

Next, a DTMF clamping function is performed to remove unwanted DTMF signals, as described herein. The present invention includes an improved and simplified approach to DTMF clamping, whereby a detector is used to detect the frequencies of each row and column tone of the DTMF scheme. A zero filter mutes the tonal signal if a row and/or column frequency is detected. Otherwise, the values of the filter coefficients are set to an all-pass configuration and the signal is simply passed as input speech.

In this way, the conferencing algorithm of the present invention takes the input PCM samples for each attendee, mutes noise, suppresses any echo, adjusts the gain as desired, and removes DTMF tones. The signal is then passed to the conferencing process of the algorithm. A sorting algorithm selects the samples whose energies are the greatest in that time frame. The top three samples are then summed as the output signal. Thus, a combined signal, which represents the top contenders in terms of the highest energy attendees' input speech is adjusted appropriately for gain and this constitutes the output PCM conference signal that is sent to each individual attendee, with an attendee's own speech subtracted from his own output signal, if needed.

BRIEF DESCRIPTION OF THE DRAWINGS

The invention description below refers to the accompanying drawings, of which.

DETAILED DESCRIPTION OF AN ILLUSTRATIVE EMBODIMENT

The conferencing algorithm of the present invention can be implemented in any number of systems that are capable of performing conferencing services for a large number of conference participants, on the order of several hundred.

Figure 1:
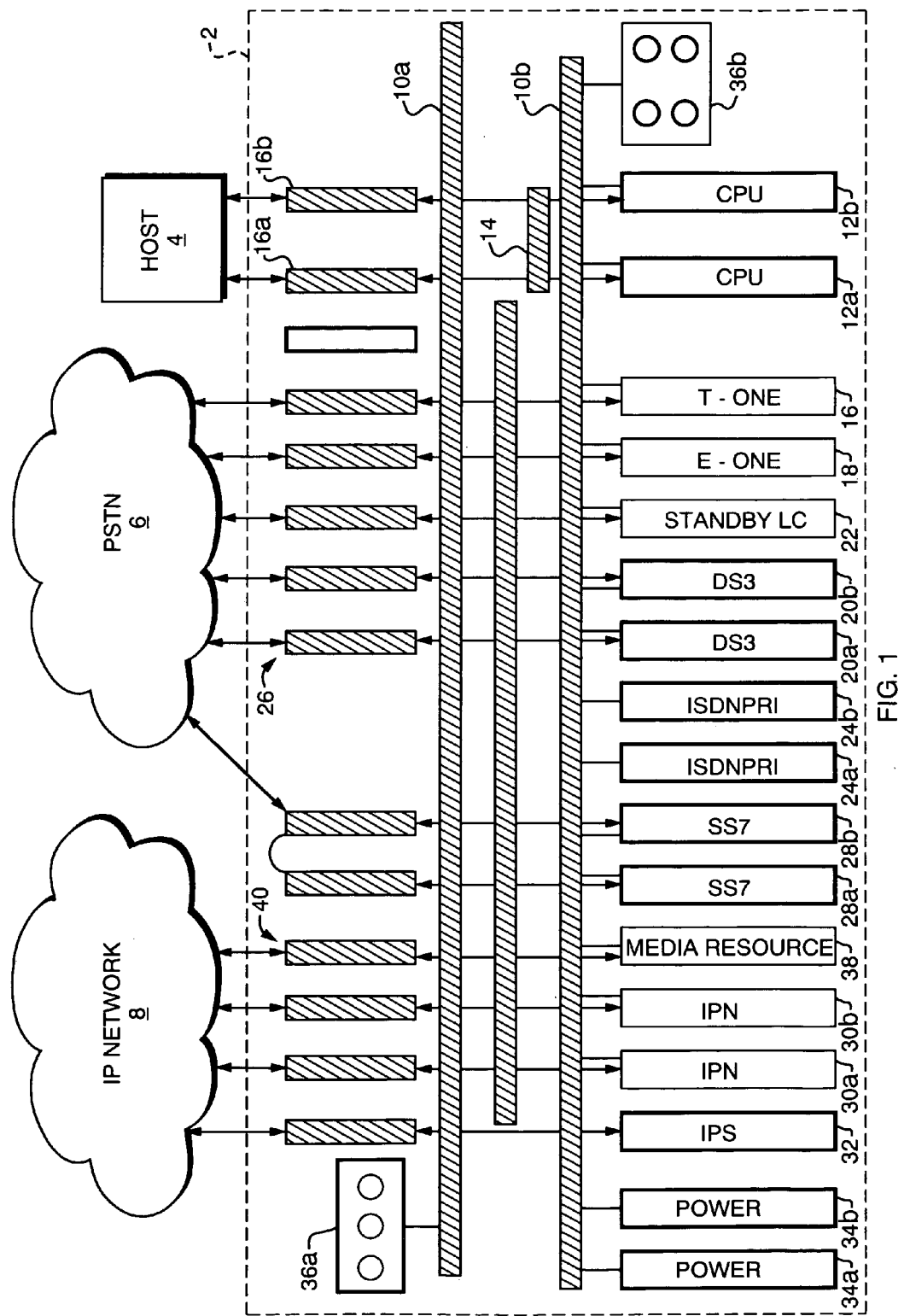
FIG. 1 is a block diagram of a converged services platform that includes a media resource card that implements the method and apparatus embodying one embodiment of the present invention.

One illustrative embodiment of the type of system with which the conferencing algorithm of the present invention may be implemented is illustrated in FIG. 1. The details of the operation of the system of FIG. 1 are described further in commonly-owned U.S. patent application Ser. No. 10/693,625 of Locascio et al. for a MEDIA RESOURCE CARD WITH PROGRAMMABLE CACHING FOR CONVERGED SERVICES PLATFORM, filed on Oct. 24, 2003, which is incorporated herein by reference.

FIG. 1 shows a converged services platform 2 which is controlled by an application program (not shown) running on a host computer 4. Hardware and software which may be used to implement a converged services platform of the type shown are available from Excel Switching Corporation of Hyannis, Mass. With the inclusion of appropriate cards discussed below, platform 2 is capable of interfacing with both the PSTN 6 and an IP network 8.

As shown, platform 2 includes redundant switching buses 10a and 10b. Redundant CPU cards 12a, 12b are connected to buses 10a, an HDLC bus 14, and to host 4 by way of input/output (I/O) cards 16a, 16b. Depending upon the requirements of a particular application, various combinations of the following "line" cards, each of which supports a particular digital telecommunications protocol, may be included within platform 2: T1 card 16; E1 card 18, DS3 cards 20a, 20b. The other components are described in detail in the above-identified patent application.

A media resource card 38 contains a number of digital signal processing cards (DSPs) not illustrated in FIG. 1, but which are fully programmable to perform the conferencing algorithm and associated signal processing in accordance with the present invention.

Figure 2:
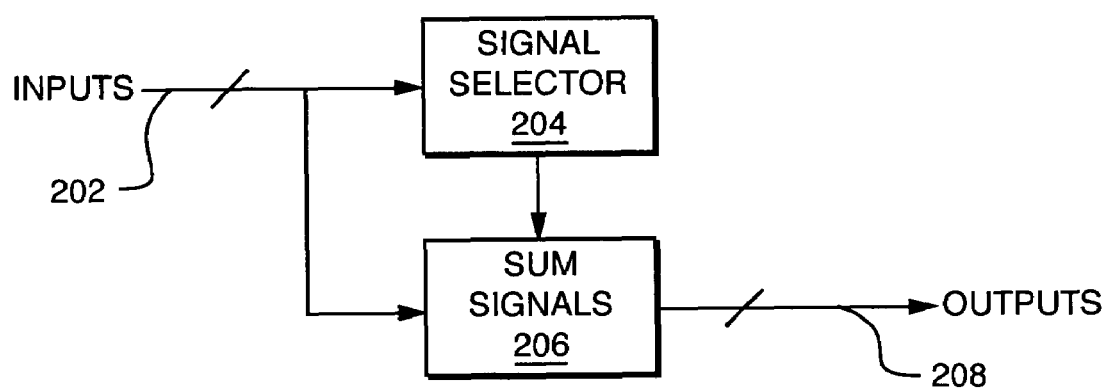
FIG. 2 is a schematic block diagram of the signal flow of the conferencing algorithm of the present invention.

By way of background, FIG. 2 broadly illustrates the signal flow of the conferencing algorithm for purposes of illustration. Inputs 202 represent samples of PCM voice information obtained every 125 microseconds from each attendee participating in a conference. These attendees can be connected by a traditional telephone over the PSTN, they may be operating in a VOIP (Voice over Internet Protocol) environment, they might be on a mobile phone, or in a conference room on a speakerphone of some type. Samples that are determined to be valid speech are then passed through and the energy of each sample is then calculated. The sample energies are then sent to a signal selector 204. The calculated energies are evaluated by a sorting algorithm that identifies the top three contenders (the samples of those participants that have the greatest energies). The selected samples are then summed as shown in the block 206, and the output is delivered as the conference output signal 208. As noted herein, when the conference output signal is delivered to one of those attendees whose sample was selected, that sample is subtracted from that conferenced information that is transmitted to that particular participant so that he does not hear his own speech returning to him.

Figure 3:
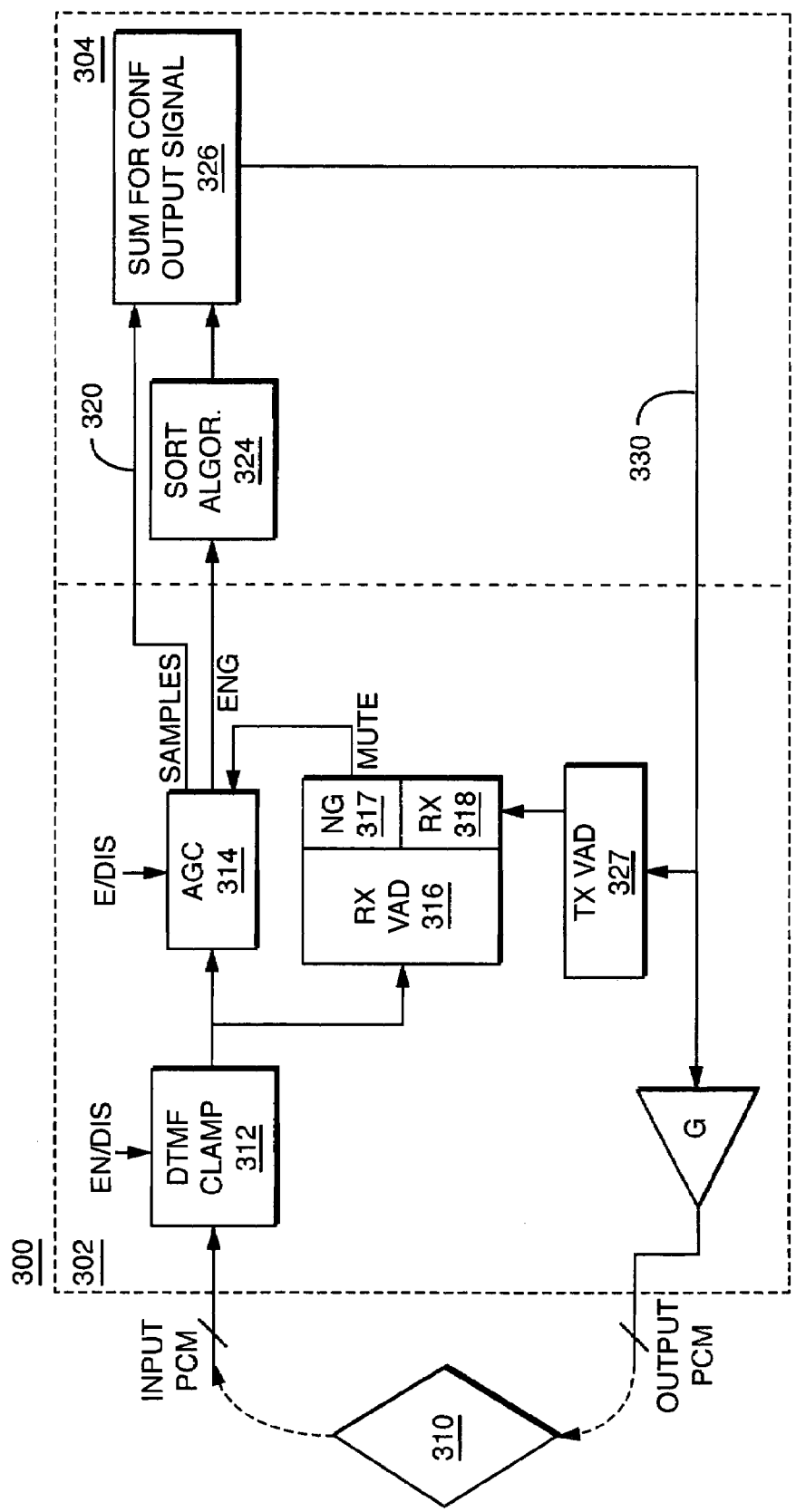
FIG. 3 is a schematic block diagram illustrating one embodiment of the apparatus that performs the conferencing algorithm of the present invention.

With the basic flow of information having been described in FIG. 2, reference is now made to FIG. 3, which is a schematic block diagram of the components that perform the conferencing algorithm and echo suppression techniques of the present invention and which may be implemented on a DSP chip of the media resources card 38 (FIG. 1), for example, in accordance with one implementation of the invention. It should be understood, however, that the conference algorithm of the present invention can be implemented in a number of different alternative embodiments. For example, the steps and processes described herein can be performed in a different order, or some steps can be omitted entirely while remaining within the scope of the present invention.

The conferencing algorithm system 300 illustrated in FIG. 3 includes an attendee process shown schematically within in the dashed box 302, and a conferencing process shown schematically in dashed box 304. A conference is established through the appropriate messaging in the system 2 of FIG. 1. An attendee participates in the conference via his/her own equipment 310. The equipment 310 delivers PCM samples of voice information to the conferencing algorithm 300. The signal processor of the DSP card includes a DTMF clamping device 312, automatic control device 314, a voice activity detector 316, each along the input path. The functions of each are described in further detail hereinafter. As noted, the conference algorithm of the present invention includes noise gating, echo suppression, automatic gain control and DTMF clamping. Each of these features will now be discussed in turn, but it should be noted that they may be performed in another order, or even separately, while remaining within the scope of the present invention.

Noise Gating

Figure 4A:
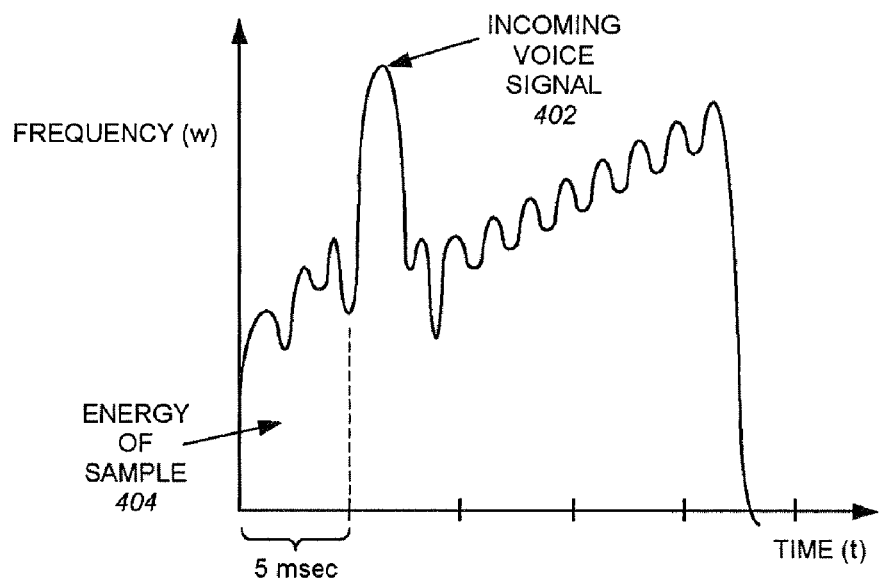
FIG. 4A is a graph of an incoming attendee voice signal.
Figure 4B:
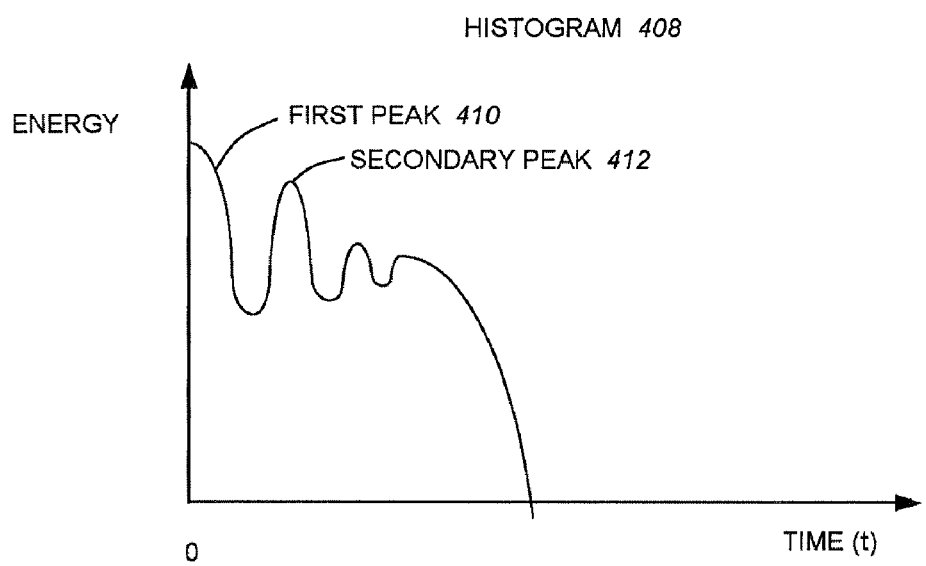
FIG. 4B is a histogram of the energy of the voice signal of FIG. 4A.

The input PCM from an attendee may contain noise, such as background noise resulting from using a mobile phone in a vehicle. It is preferable that the noise is muted so that it does not get summed back into the conference. The overall process of the noise gating techniques of the present invention may be better understood with reference to the graphs of FIGS. 4A and 4B. The incoming voice signal 402 is shown in FIG. 4A, which is a plot of the input voice signal (in frequency) over time. The energy of the sample is the sum of the squares of the signal over a predetermined time period. This is illustrated as block 404, and in one embodiment of the invention, the time interval is a 5 millisecond (msec) block. A histogram 408 is shown in FIG. 4B which is a plot of the total energy level for each 5 msec time block. This histogram 408 is evaluated to determine a noise peak. This evaluation is conducted by the signal processing circuitry 317 in the attendee process 302 of the conference algorithm system 300 (FIG. 3).

The first peak 410 appearing in the histogram 408 close to zero is preferably ignored as it is the result of a noise gating process performed by a component located in the equipment 310 being used by the individual attendee. Thus, the true noise is reflected in secondary peaks. In accordance with the invention, the histogram 408 is evaluated to find the most occurring energy representation and sets this as a noise floor. Incoming energies must then exceed that threshold for those energies to be declared as speech. Logic is applied to the histogram when there are multiple peaks to determine the best noise floor. The logic is based upon a relationship between the ratio of the average histogram value to that of the second peak. If the ratio exceeds a predetermined amount, then the sample is determined to be speech and is above the predetermined noise floor. The noise floor is updated periodically as the conference proceeds. If it should it be determined that this sample contains noise, then the noise gating module 317 sends a mute signal to the automatic gain control 314, which mutes the signal and thereby does not send that sample into the conferencing process. If the sample has been determined to be speech, it is then determined whether it is not true speech but actually echo, and if so, the echo suppression techniques of the present invention are employed.

Echo Suppression

Voice activity detector 316 (FIG. 3) includes an echo suppression module 318. By way of background, and as will be understood by those skilled in the art, echo cancellation, for example, which differs from echo suppression, involves creating a model of an echo that is expected to occur in the signal, thus creating a synthetic echo. The model is created based upon a matrix that is populated with voice samples taken every 125 microseconds, and the voice signal is checked, sample by sample for echo. The modeled echo is then subtracted out of the input signal as necessary. Though this is an effective way of removing echo, the computational cost of such a solution is quite large and not practical in conferences in which hundreds of attendees may be involved.

In accordance with the present invention, instead of populating the matrix with individual PCM samples, the energies that are already calculated are used to build a synthetic echo envelope rather than a synthetic echo (step 510).

Figure 5A:
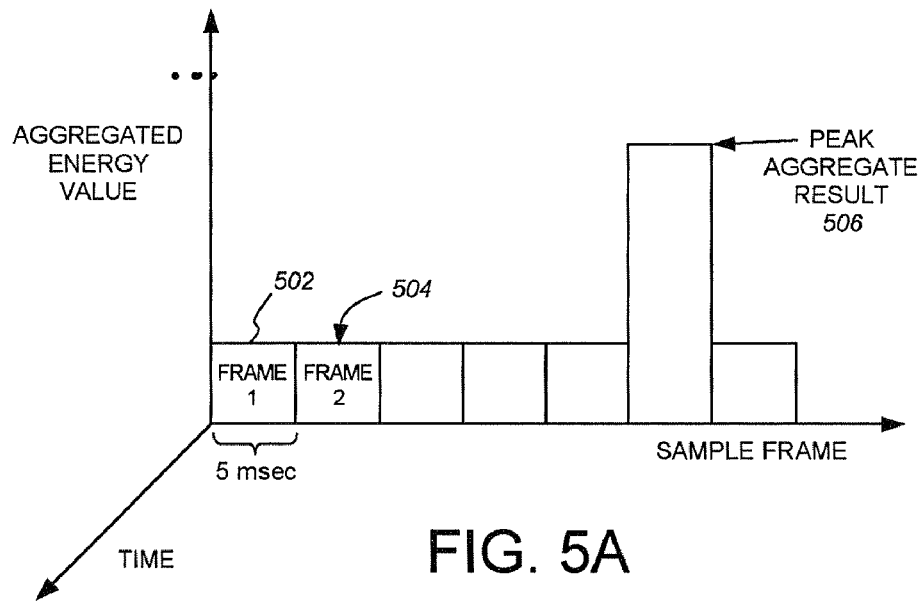
FIG. 5A is a plot of the results of the normal equations that are solved in accordance with the echo suppression process of the present invention.
Figure 5B:
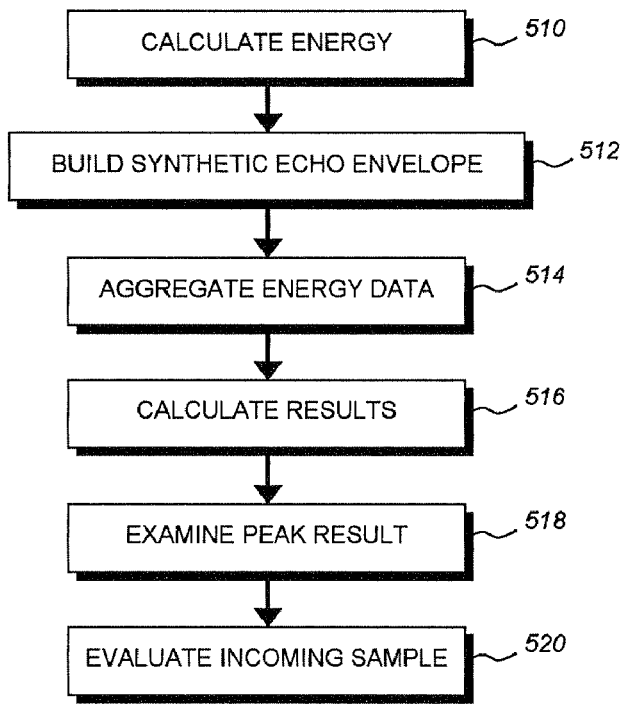
FIG. 5B is a flowchart of the illustrative embodiment showing a method for suppressing echo.

In FIG. 5B a synthetic echo envelope is used to determine the delay and the gain of the echo signal (step 512). With this information, a very robust determination can be made of whether a signal is echo or true input speech. More specifically, the energy data for the samples over a 5 millisecond period are aggregated to form a frame of the aggregate energy value for that period step 514). A matrix is then populated with these aggregate energy values. The normal equations are then solved. (step 516). The aggregate energy values are then examined per frame (step 518), as shown in FIG. 5A. Each 5 msec energy frame 502 and 504, for example, represent the aggregate energy value for that 5 msec time block. A peak aggregate result 506 is identified. In order to further refine this result, the present invention includes the additional step of smoothing the results by applying a moving average to the correlations and energies over each frame of data across the time dimension. This moving average thus provides a more accurate gain and delay prediction for the echo. With this gain and time delay information, each incoming energy aggregate frame is evaluated against the corresponding output energy at a determined time lag (step 520). If the input speech energy is determined to be less than the historical output energy scaled by the determined gain, then the signal is classified as echo.

During this 5 msec window, the algorithm of the present invention looks at the present 5 msec energy aggregate frame to see if it is echo, and if a decision is made that it is echo, then that decision is reflected in the prior 5 msec aggregate frame, so that there is time for it to be suppressed, if it is echo. If not, it is passed as valid speech.

This process identifies a gain and time delay that produces an accurate prediction of echo so that when echo is expected, it is removed or masked from the speech. Accordingly, the echo will not be summed into and returned as part of the conference output.

DTMF Clamping

As noted herein, another issue that arises in conferencing occurs when DTMF tones may be summed into the conference signal, which creates a number of problems, which have already been discussed in detail. In accordance with the present invention, is these DTMF tones are removed without committing additional component hardware, power requirements or computational resources to the task. For example, a prior art method stacks eight notch filters set at the frequencies of each DTMF row and each column frequency and remove DTMF in that way. However, this method is computationally expensive, and degrades non-DTMF signal quality.

Figure 6:
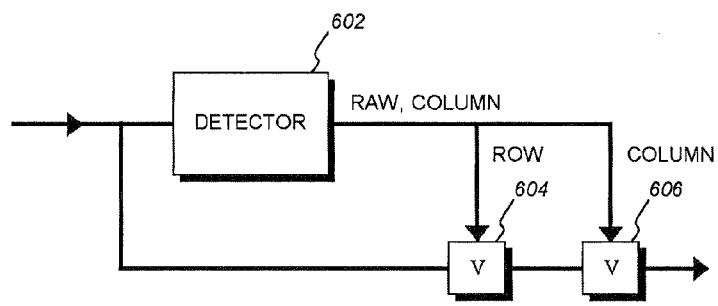
FIGS. 6 and 7 are schematic block diagrams of the DTMF clamping circuit and filters of the present invention.

In accordance with the present invention, as illustrated in FIG. 6, a detector 602 very broadly detects the signals for the rows and column tones of the DTMF signals. On a parallel track indicated by the line 605, the signal is sent through two Finite Impulse Response filters 604 and 606.

Figure 7:
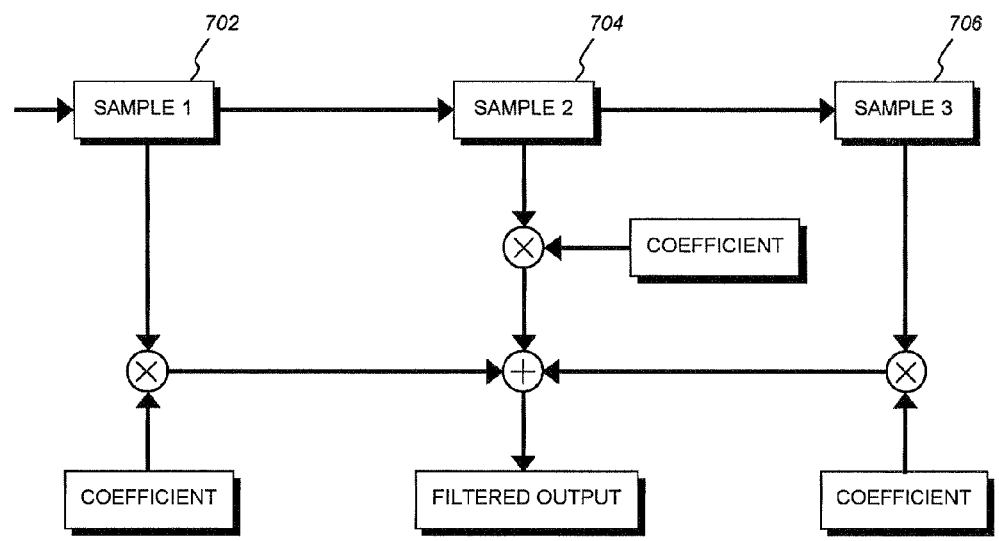

This is illustrated in further detail in FIG. 7, the signal comes in as illustrated at 701. Bins 702, 704 and 706 represent successive samples. Each sample, such as the sample 702, gets multiplied by a corresponding coefficient C. The sum of these 3 multiplications is the filtered output. This is illustrated by the block 708. To change the filter, it is only necessary to change the values of the 3 coefficients, such as the coefficient 708. Based upon the results of the detector 602, the present invention selects from a bank of filter coefficients the appropriate filters to remove the detected tones. If no DTMF signal is present the filter coefficients are set to an all-pass configuration.

In operation, the conferencing algorithm of the present invention begins with the attendee process 302, (FIG. 2), which includes a DTMF clamping module 312, an automatic gain control 314 which can be enabled, if desired. The voice activity detector 316 includes noise gating 317 and 318 modules, which, in the case that noise is detected, the input is muted. Echo suppression module 318 detects and suppresses echo. The samples are then sent from the automatic gain control 314 into the conference process 304, as shown by the line 320. Energies are calculated, and sent to a sorting algorithm 324 that selects the 3 greatest energies for summing into the conference as illustrated schematically by the block 326. The conference output signal is transmitted, as shown by line 330, and gain adjusted appropriately via component 336, and the output PCM is then sent to the attendee's equipment 310. Transmit Voice activity information is provided by transmit voice activity detector 327, which is used to indicate when to look for the incoming echo. In other words, the system looks for incoming echo when there is signal going out to the line in the conferencing environment.

It should be understood that the audio conferencing algorithm of the present invention mixes the input speech of a large number of parties and produces an aggregate output that is of high perceptual quality. Noise has been removed and echo suppressed, as well as DTMF having been removed from the signal without a large computational, component or capacity expenditure.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of performing echo suppression in a telecommunications system, the method comprising:
    (A) calculating at least one value representing energy in a plurality of pulse code modulated (PCM) samples of an input speech signal;
    (B) building a synthetic echo envelope from said values;
    (C) aggregating said values for the at least one sample over a period of time to form a frame of an aggregate energy value for that period of time;
    (D) solving a plurality of normal equations for said aggregated values, the plurality of normal equations having a plurality of results;
    (E) examining the results to determine a peak aggregate result, the peak aggregate indicating a time delay and a gain of an echo path; and
    (F) evaluating each incoming PCM sample against a corresponding output energy result obtained at a determined time delay, and if an input speech energy is determined to be less than a historical output energy scaled by a determined gain, then suppressing echo from the input speech signal.

2. The method of performing echo suppression as defined in claim 1 including the further step of smoothing the results of the normal equations by applying a moving average to correlations and energies over each frame across the time dimension.

3. The method of performing echo suppression as defined in claim 1 including the further step of determining said time delay by measuring the time elapsed between the beginning of measurements and the reaching of the peak aggregate result.

4. The method of performing echo suppression as defined in claim 1 including the further step of employing a voice activity detector to verify that voice information is on the line and if so, then performing steps A through F and suppressing any echo that is determined to exist.

5. An apparatus for performing echo suppression techniques in a telecommunications system, the apparatus comprising:
    (A) a receiver that receives a plurality of pulse code modulated (PCM) samples of voice information from a user coupled with the system;
    (B) an energy accumulator coupled to said receiver that calculates at least one energy value for input speech signals and aggregates the energy values over a predetermined time period to create a synthetic echo envelope from said samples;
    (C) digital signal processing circuitry coupled with said receiver and said energy accumulator adapted to:

(i) evaluate said energy values to find a peak aggregate value and a time lag; and (ii) check each PCM sample against said peak aggregate value and time lag to determine whether said speech samples contain an echo; and (D) an echo suppressor responsive to said digital signal processing circuitry for suppressing the echo that is determined to exist in an incoming speech sample.

6. The apparatus for performing echo suppression techniques as defined in claim 5 further comprising a voice activity detector coupled with said receiver that determines whether incoming samples contain speech, and if so, said echo suppression techniques are performed.

7. A system for performing echo suppression techniques, the system comprising (A) a receiver that receives pulse code modulated (PCM) samples of voice information from a user coupled with the system;

(B) an energy accumulator coupled to said receiver that calculates energy values of input speech signals and aggregates these energy values over a predetermined time period to create a synthetic echo envelope from said samples;

(C) digital signal processing circuitry coupled with said receiver and said energy accumulator that is adapted to:

(i) evaluate said energy values to find a peak aggregate value and a time lag; and (ii) check each incoming PCM sample against said peak aggregate value and time lag to determine whether said speech samples contain echo; and (D) an echo suppressor responsive to digital signal processing for suppressing echo that is determined to exist in an incoming speech sample.

8. The system for performing echo suppression techniques as defined in claim 7 further comprising a voice activity detector coupled with said receiver that determines whether incoming samples contain speech, and if so, said echo suppression techniques are performed.

* * * * *